Dec. 22, 1931.  R. R. STABLER  1,837,732
ILLUMINATED FOUNTAIN
Filed June 27, 1929  3 Sheets-Sheet 1

INVENTOR.
Robinson R. Stabler
BY
Charles B. Mann Jr,
ATTORNEY.

Dec. 22, 1931.  R. R. STABLER  1,837,732
ILLUMINATED FOUNTAIN
Filed June 27, 1929   3 Sheets-Sheet 2
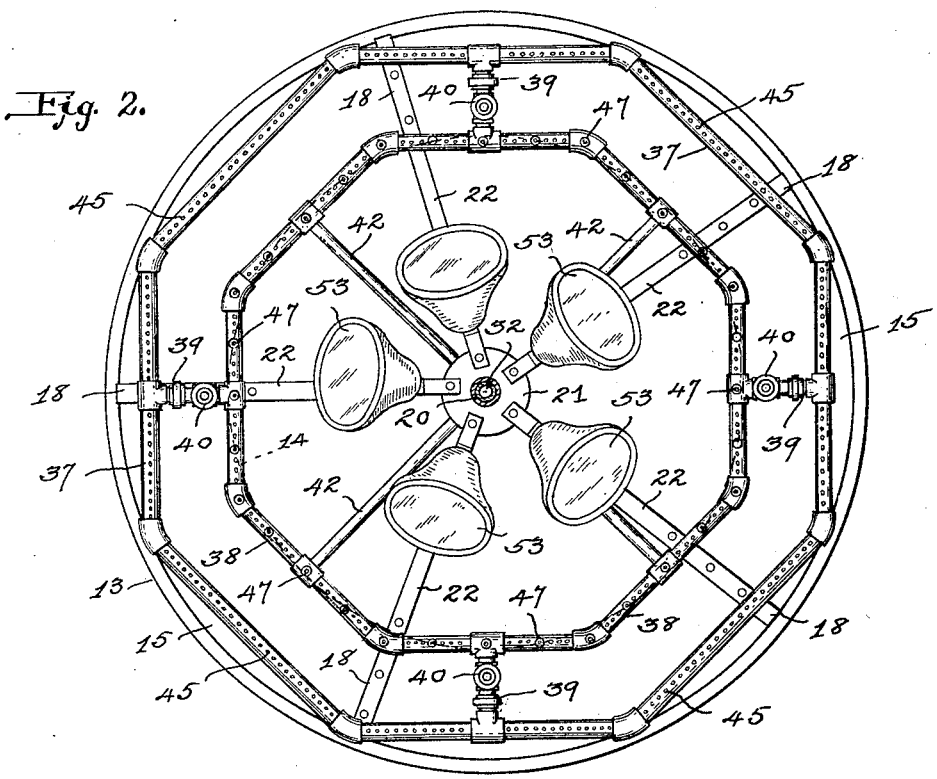
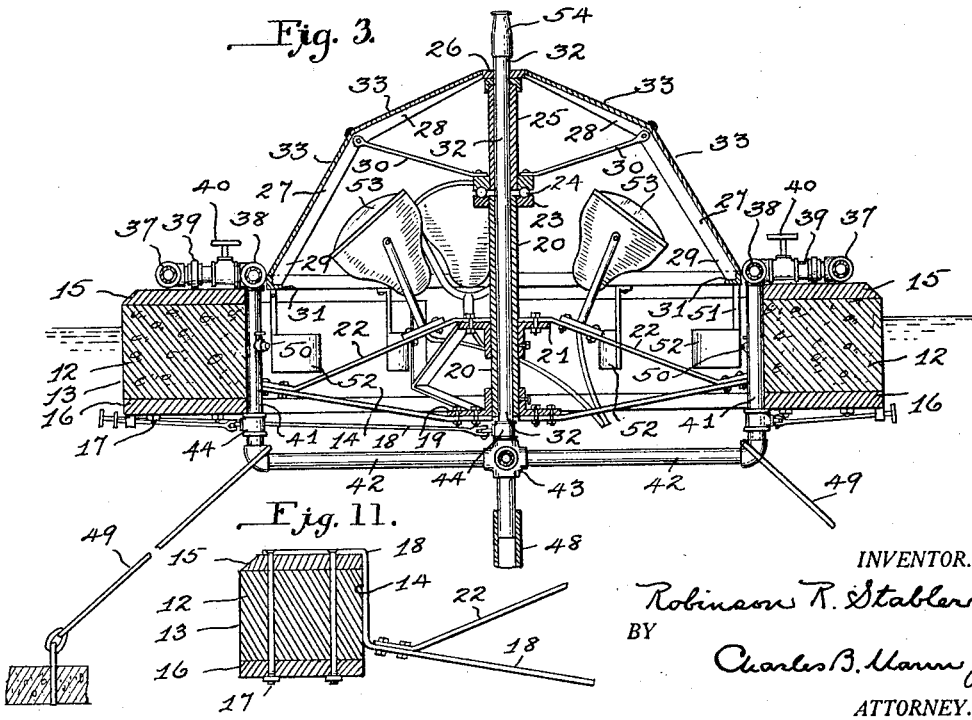
INVENTOR.
Robinson R. Stabler
BY
Charles B. Mann Jr.
ATTORNEY.

Dec. 22, 1931.  R. R. STABLER  1,837,732
ILLUMINATED FOUNTAIN
Filed June 27, 1929  3 Sheets-Sheet 3
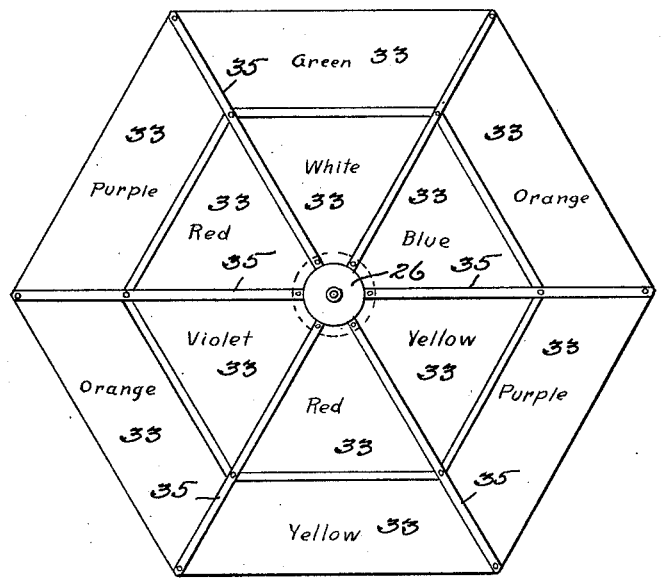
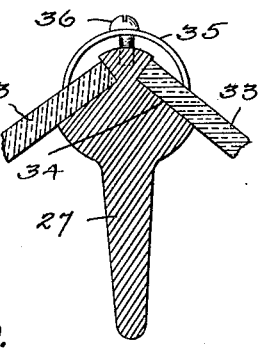
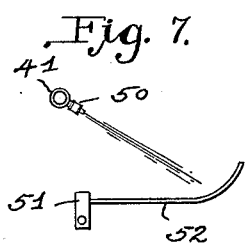
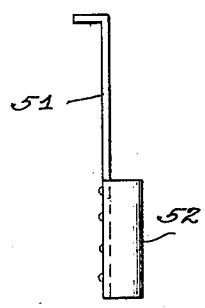
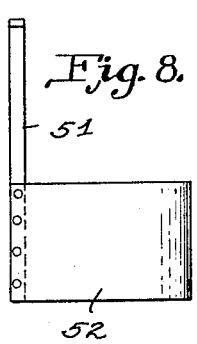
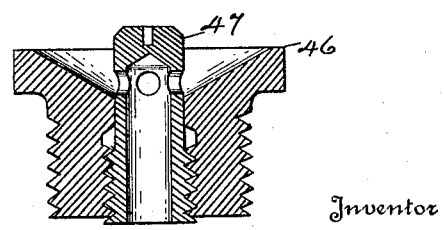

Patented Dec. 22, 1931

1,837,732

UNITED STATES PATENT OFFICE

ROBINSON RYLAND STABLER, OF GREENSBORO, NORTH CAROLINA

ILLUMINATED FOUNTAIN

Application filed June 27, 1929. Serial No. 374,173.

This invention relates to improvements in illuminated fountains wherein the sprays of water are illuminated.

One object of the invention is to provide an improved construction of fountain whereby the same may be portable.

Another object is to provide a novel construction of illuminating means whereby the sprays of water may be pleasingly illuminated.

A further object is to provide novel means for varying the effects of the illumination of the water sprays.

A still further object is to provide a novel fountain structure which will float in water whereby the same may be anchored in any desired position in a pond or lake and have the same effect and appearance of a permanently-fixed structure, and A further object is to provide a novel arrangement of movable colored plates located between the lamps and the sprays of water, with novel means for causing their movement to produce pleasing varying colored effects.

With these, and other objects in view, the invention is illustrated in the accompanying drawings, wherein,—

Fig. 2 illustrates the fountain in top view with the revolving canopy removed.

Fig. 3 shows a central vertical cross-section through the entire structure.

Fig. 4 illustrates the detached canopy in top view.

Fig. 5 shows an enlarged cross-sectional detail through one of the angle bars of the canopy with the glass plates in place and the cover-plate bridging the joint.

Fig. 6 illustrates a portion of one of the vertical stretches of water-supply pipe with the nozzle therein to effect a rotary movement of the canopy.

Figs. 7, 8 and 9 show three views of the blade which depends from the canopy and through which the latter is caused to revolve.

Fig. 10 illustrates a vertical sectional detail through one of the nozzles, and

Fig. 11 shows a vertical sectional detail through the ring-float to illustrate how the interior bar-frame is sustained.

Figure 1:
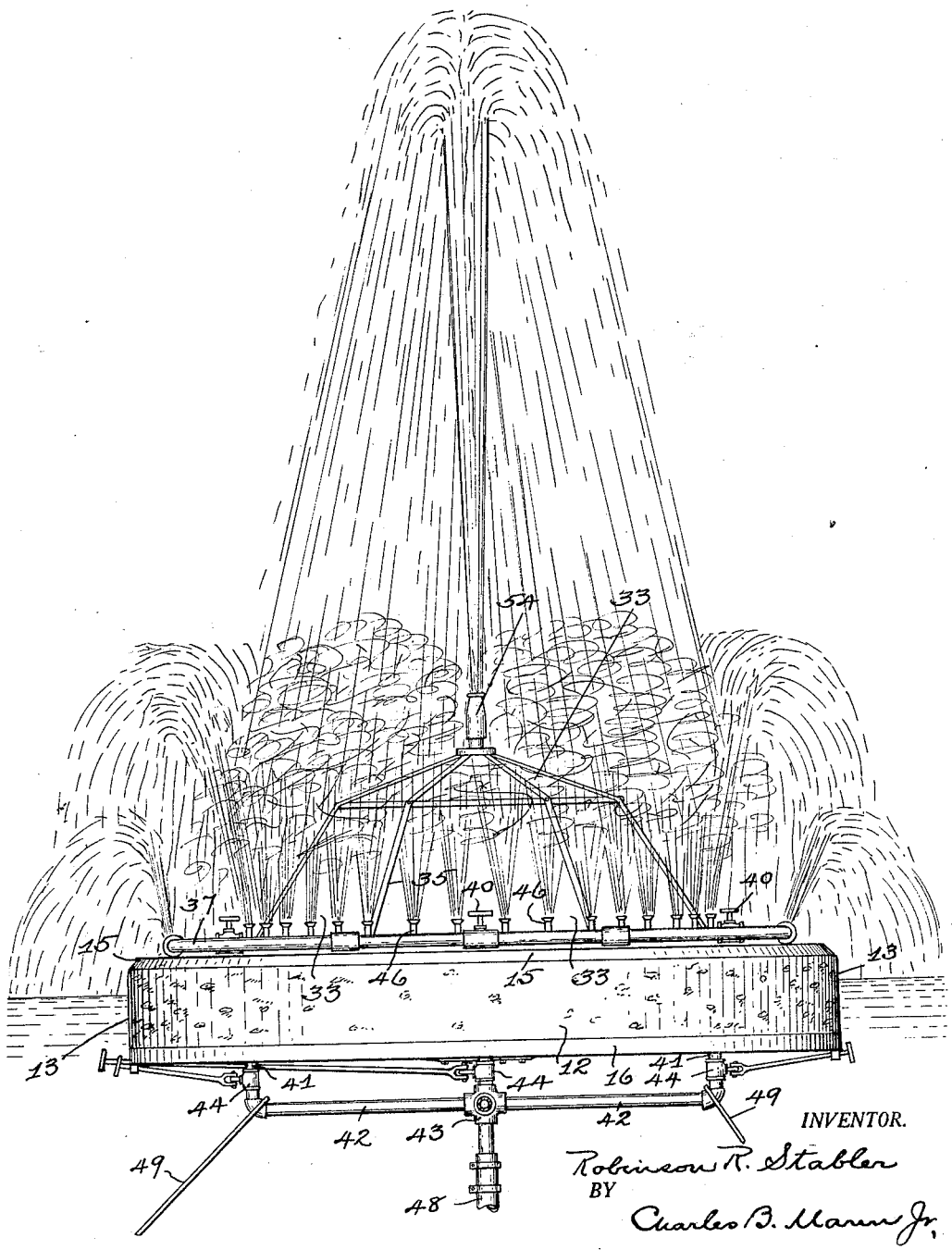
Fig. 1 shows the complete fountain structure in elevation.

In the drawings the numeral 12 designates a floating body which may be formed of any suitable material or of such construction as will provide sufficient buoyancy to carry the fountain structure and remain afloat.

In practice, I employ a body of an annular or ring-shape with outer and inner circular walls 13 and 14 and I preferably form this body of cork which is held together by a suitable binder and reinforced around the top and bottom by ring-plates 15 and 16 which are held by vertical bolts 17.

A series of radially-arranged flat bars 18 are employed in the present disclosure, and the outer ends of these bars seat on the top ring-plate 15 and are secured thereto by the same vertical bolts 17 which extend through both ring-plates and the body.

By reference to Figs. 2, 3 and 11 of the drawings, it will be noted that the radial bars extend down at the inner circular wall 14 of the annular body and then extend toward the axis of the body where their inner ends are all secured to a collar 19 carried on the lower end of a central vertical sleeve 20.

A second collar 21 is secured to the central sleeve above the lower collar 19 and brace-bars 22 extend from the upper collar in an inclined direction toward the inner wall 14 of the body and the lower ends of these brace-bars seat upon and are bolted to the upper sides of the flat radial bars 18 near the base of the annular body.

This construction produces a central frame of radial bars within the annular body which frame sustains a central vertical sleeve 20 at the central axis of the body.

The upper end of the central sleeve carries a collar 23 whose upper surface has an annular race in which suitable balls or anti-friction devices 24, are arranged, and on top of these anti-friction devices there is seated the lower end of a central tubular canopy-support 25.

The upper end of the canopy-support sustains a central plate 26 of a canopy and from this plate there extend a series of radial ribs 27 which latter have upper portions 28 which incline laterally and slightly downwardly and lower depending ends 29. Brace bars 30 radiate from the lower end of the canopy-support 25 and engage the ribs, whereby to stiffen the latter, and an angle-bar frame 31 is provided all the way around the lower ends of the ribs.

The entire canopy structure has a form somewhat like that of an opened umbrella, with ribs and stretcher-bars but with the exception that the ribs and bars do not fold. A vertical pipe 32 extends up through the sleeve 20 and also through the tubular canopy-support 25 so that said pipe serves as a shaft for sustaining the canopy and about which the canopy may be revolved as will presently be explained.

In the present instance, the canopy is of hexagonal shape and the shapes of the ribs are such as to lend themselves readily to the support of a series of colored glass plates 33.

The glass plates are supported between adjacent ribs of the canopy,—the ribs being suitably grooved or cut away as shown at 34 in Fig. 5, and clip plates 35 straddle the joints of the adjacent plates with the ribs and are held in place by screws 36 which enter the ribs.

On top of the floating body, I provide an outer and an inner arrangement of spray pipes 37 and 38, with branch-pipe connections 39 and valves 40 therein to permit an equal distribution of water in said pipes.

In the present instance, I provide a plurality of vertical pipes 41 at the inner circumference of the annular body 12 whose upper ends are tapped into or connected with the inner set 38 of pipes while the lower ends of these vertical pipes are connected to a series of radial horizontal pipes 42 that join a central head 43.

The central vertical pipe 32 which extends up through the center of the canopy also has its lower end connected to the central head 43.

It is thus to be understood that all of the pipes hereinbefore referred to, are carried by the floating body and that all of said pipes are supplied with water through their several connections with the central head 43.

Suitable valves 44, are provided in the vertical pipes to control the flow of water therethrough.

In the present disclosure I provide the outer pipe-arrangement 37, on top of the float, with a series of outlets 45 for the escape of water in the form of jets and in the inner pipe-arrangements 38 I provide a series of nozzles 46 each of which has a central adjustable stem 47 to vary the form of spray or stream ejected thereby. The form of these nozzles 46 is disclosed in Fig. 10 of the drawings.

A water supply-pipe 48, which, in practice, may be a flexible hose or a pipe is attached to the under side of the central head 43 to conduct water under pressure to the fountain.

Suitable anchorage cables 49 are attached to some permanent part of the fountain structure in order to anchor the fountain in a pond or lake at the desired location.

In case the fountain is placed in a pond or reservoir where there is a rise or fall in the depth, the fact that the structure is floatable ensures that the water line about the fountain will remain uniform and only so much of the fountain will always remain above the water level.

I have provided, in this instance, what I believe to be a novel means for effecting a rotation of the canopy and its colored glass plates, and I will now explain the same, reference being made to Figs. 3, 6, 8 and 9 of the drawings.

It has been explained that the canopy is mounted on the support 25 and anti-friction devices 24, so it may be revolved.

Is is believed to be clearly understood that the floating body 12 is annular and of a ring-shape; that the center thereof is cut away and hollow, so that when the body is placed in a pond, lake or pool, it will float, and a circular body of water will be present at the center of the annular body. I make use of this center circular body of water to effect a slow rotation of the canopy of colored glass, by causing that body of water to slowly travel in a circular path within the center of the ring.

I effect this movement of water at the center of the ring-body by providing one or more of the vertical stretches 41 of the supply-pipes with a spray-nozzle 50, which nozzles are so disposed as to direct a stream or spray of water at the inner side of the ring and into the circular body of water,—the direction of the stream or spray being such as to cause that central body of water to rotate within the ring. The rotation is preferably at a slow rate and this is regulated by the amount and force of the water ejected from the nozzles 50.

To utilize this rotating body of water, I provide a plurality of arms 51 which are attached to and depend below the angle-bar frame 31, at the lower edge of the canopy. Each arm 51 carries a vane or blade 52, which is submerged in the central body of water and against which the streams or sprays from the nozzles 50 impinge so that by direct impingement of the streams against the vanes or sprays and the rotation of the central body of water itself through the action of those same streams, the vanes are caused to move in a circular direction and thus cause the canopy to revolve slowly.

Beneath the canopy, and supported on the bars 22, are a plurality of electric lamps 53, the wiring for which is lead through suitable water-proof cables to the shore.

In practice, water is supplied through a pipe or hose 48 from a water-supply and delivered to the head 43, from which it is distributed by the pipes 42, 41, 38, 39 and 37 so that it may be sprayed in jets from the perforations 45, and nozzles 47 as well as through the central pipe 32 and the nozzle 54, at the upper end thereof.

The lamps, when illuminated, will direct their light rays through the colored plates 33 of the canopy and the jets or streams from the nozzles 50, will cause the canopy and its colored plates to revolve.

Obviously, as the canopy revolves, its colored plates will travel between the lamps and the sprays of water from the outer and inner pipes 37 and 38 and the central nozzle 54, and most pleasing and ornamental illuminating effects will thereby be produced.

Having described my invention, I claim,—

1. In an illuminated fountain the combination with an annular body which will float in water, of piping carried by the annular body, said piping having a series of water outlets, a rotatable canopy sustained at the center of the annular body, said canopy having colored plates through which light may pass, illuminating means within the annular body and beneath the canopy and means at the inner side of the annular body for rotating the canopy.

2. In an illuminated fountain the combination with an annular body which will float in water, of piping carried by the annular body said piping having a series of water outlets, a rotatable canopy sustained at the center of the annular body said canopy having colored plates through which light may pass, illuminating means within the annular body and beneath the canopy and water-spraying means at the inner side of the annular body for effecting a rotation of the canopy.

3. The combination with a ring-shaped body which will float in water and open at the center so that the sustaining water may rise at the center opening, of piping having discharge-openings, said piping being carried by the body and depending below the latter, a central discharge-pipe at the axis of the ring, a canopy rotatably mounted about said central pipe, illuminating means beneath the canopy, means depending from the canopy into the central opening of the ring-body and means for rotating the body of water at the center of the body to rotate the canopy through the depending means.

4. In an illuminated fountain the combination with a canopy having plates through which light may pass, of illuminating means beneath the canopy, means for rotatably sustaining the canopy, a body around the base of the canopy, said body having a central opening, vanes carried by the canopy, said vanes depending into the central opening of the body, means for directing jets of water against said vanes to cause them to travel and rotate said canopy and piping for ejecting streams of water about the canopy.

5. In an illuminating fountain the combination with a canopy having plates through which light may pass, of illuminating means beneath the canopy, means for rotatably sustaining said canopy, a body around the base of the canopy said body having a central opening to contain water, means to cause the water in said central opening to move in a circular direction, means attached to the canopy, said latter means depending into the moving water in said central opening and effecting a rotation of said canopy and piping for ejecting streams of water about the canopy.

6. In an illuminated fountain the combination with a float having a central opening communicating with the body of water on which the float is supported, of a canopy over said central opening, means for supporting the canopy so it may rotate, illuminating means under the canopy, piping supported by the float for delivering sprays of water around the canopy and means for producing sprays of water in said central opening of the float to effect a rotation of the canopy.

7. In an illuminated fountain the combination with a float having a central opening communicating with the body of water on which the float is supported, of a canopy supported by the float over said central opening and the water thereunder, illuminating means arranged under the canopy, piping for delivering sprays of water above the float and around the canopy and means in the central opening of the float for moving the body of water in the central opening in a circular direction and effect a rotation between the canopy and the illuminating means.

8. In an illuminating fountain the combination with a float forming an outer body with a central opening so that water in which the body floats will be exposed at said central opening, a canopy rotatably supported from the float-body and extending above the central opening, illuminating means under the canopy, means for causing the water in the central opening to be moved in a circular direction and vanes depending from the canopy means into the moving water in the central opening.

In testimony whereof I affix my signature.

ROBINSON R. STABLER.